(12) United States Patent
Hao et al.

(10) Patent No.: US 8,972,032 B2
(45) Date of Patent: Mar. 3, 2015

(54) METHOD FOR OVERLOAD PROTECTION OF SMA DEVICE

(75) Inventors: Lei Hao, Troy, MI (US); Xiujie Gao, Troy, MI (US); Sanjeev M. Naik, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1179 days.

(21) Appl. No.: 12/797,911

(22) Filed: Jun. 10, 2010

(65) Prior Publication Data

US 2010/0332151 A1 Dec. 30, 2010

Related U.S. Application Data

(60) Provisional application No. 61/220,562, filed on Jun. 25, 2009.

(51) Int. Cl.
*G05B 9/02* (2006.01)
*H02N 2/14* (2006.01)
*H02N 2/10* (2006.01)

(52) U.S. Cl.
CPC . *H02N 2/142* (2013.01); *H02N 2/10* (2013.01)
USPC ............. 700/79; 700/13; 700/14; 700/33; 700/34; 700/41; 700/46; 700/69; 700/78; 700/275

(58) Field of Classification Search
None
See application file for complete search history.

(56) References Cited

U.S. PATENT DOCUMENTS

| | | | |
|---|---|---|---|
| 3,495,175 A * | 2/1970 | Munch Edvard | 455/501 |
| 3,992,879 A * | 11/1976 | Miyamori et al. | 60/288 |
| 5,048,033 A * | 9/1991 | Donahue et al. | 372/38.04 |
| 5,170,065 A | 12/1992 | Shimizu et al. | |
| 5,436,427 A * | 7/1995 | Bourque | 219/130.1 |
| 5,662,294 A * | 9/1997 | Maclean et al. | 244/219 |
| 5,673,365 A * | 9/1997 | Basehore et al. | 706/46 |
| 5,686,149 A | 11/1997 | Buhlmann | |
| 6,211,636 B1 * | 4/2001 | Matsubara et al. | 318/434 |
| 6,487,458 B1 * | 11/2002 | Trapasso | 700/28 |
| 7,059,664 B2 | 6/2006 | Aase et al. | |
| 7,493,990 B2 * | 2/2009 | Cortona et al. | 187/292 |
| 2005/0198907 A1 | 9/2005 | McKnight et al. | |
| 2005/0240543 A1 * | 10/2005 | McClanahan et al. | 706/16 |
| 2007/0121116 A1 * | 5/2007 | Greening et al. | 356/460 |
| 2007/0247101 A1 * | 10/2007 | Noda et al. | 318/582 |
| 2008/0024940 A1 | 1/2008 | Plunkett et al. | |
| 2008/0204948 A1 * | 8/2008 | Zhang et al. | 361/20 |

(Continued)

OTHER PUBLICATIONS

U.S. Appl. No. 12/814,841, Hao, Lei.

*Primary Examiner* — Sean Shechtman

(57) ABSTRACT

A method for detecting a mechanical overload condition of an energized linear actuator to prevent commanding an activation signal to the linear actuator that may mechanically overload the linear actuator includes monitoring feedback variation of a movable element associated with the linear actuator including monitoring a present feedback signal of the movable element, monitoring a previous feedback signal of the movable element, comparing the present feedback signal and the previous feedback signal and determining the feedback variation based on the comparing. The feedback variation is compared to a feedback variation threshold. An input signal associated with the activation signal for controlling the linear actuator is monitored and the input signal compared to an input signal threshold. The electrical overload condition is detected when the feedback variation is less than the feedback variation threshold and the input signal is greater than the input signal threshold.

19 Claims, 10 Drawing Sheets

(56) References Cited

U.S. PATENT DOCUMENTS

2009/0155089 A1* 6/2009 Reinschke .................. 417/44.1
2010/0099346 A1 4/2010 Browne et al.
2010/0112924 A1 5/2010 Alexander et al.
2010/0269703 A1* 10/2010 Lin ................................ 99/281

* cited by examiner

METHOD FOR OVERLOAD PROTECTION OF SMA DEVICE

CROSS REFERENCE TO RELATED APPLICATIONS

This application claims the benefit of U.S. Provisional Application No. 61/220,562, filed on Jun. 25, 2009, which is incorporated herein by reference.

TECHNICAL FIELD

This disclosure is related to detecting and preventing an overload condition from damaging an energized active material.

BACKGROUND

The statements in this section merely provide background information related to the present disclosure and may not constitute prior art.

Active materials provide actuation with relatively low cost and mass. Active materials may include shape memory alloys (SMAs), electroactive polymers (EAPs), piezoelectric, magnetostrictive and electrorestrictive materials. By applying a current through the active material to increase the temperature or the magnetic field of the active material, an active material is capable of recovering strain developed from an exerted stress or load. The ability to recover strain enables the active material to provide actuation. In many applications, the active material is an SMA wire or cable. However, due to the thermal characteristics of SMA material, overload protection is desirable to prevent the wire from overstretching and thus losing the ability to recover strain when activated.

SUMMARY

A method for detecting a mechanical overload condition of an energized linear actuator to prevent commanding an activation signal to the linear actuator that may mechanically overload the linear actuator includes monitoring feedback variation of a movable element associated with the linear actuator including monitoring a present feedback signal of the movable element, monitoring a previous feedback signal of the movable element, comparing the present feedback signal and the previous feedback signal and determining the feedback variation based on the comparing. The feedback variation is compared to a feedback variation threshold. An input signal associated with the activation signal for controlling the linear actuator is monitored and the input signal compared to an input signal threshold. The electrical overload condition is detected when the feedback variation is less than the feedback variation threshold and the input signal is greater than the input signal threshold.

BRIEF DESCRIPTION OF THE DRAWINGS

One or more embodiments will now be described, by way of example, with reference to the accompanying drawings, in which.

DETAILED DESCRIPTION

Figure 1A:
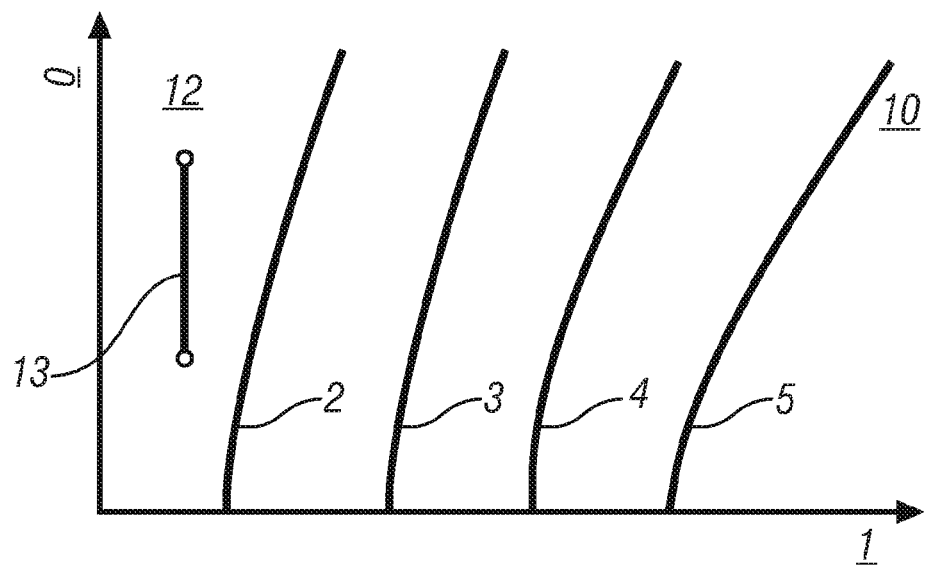
FIGS. 1A and 1B are phase diagrams of critical stresses of austenite-martensite crystal transformations as functions of temperature, in accordance with the present disclosure.
Figure 1B:
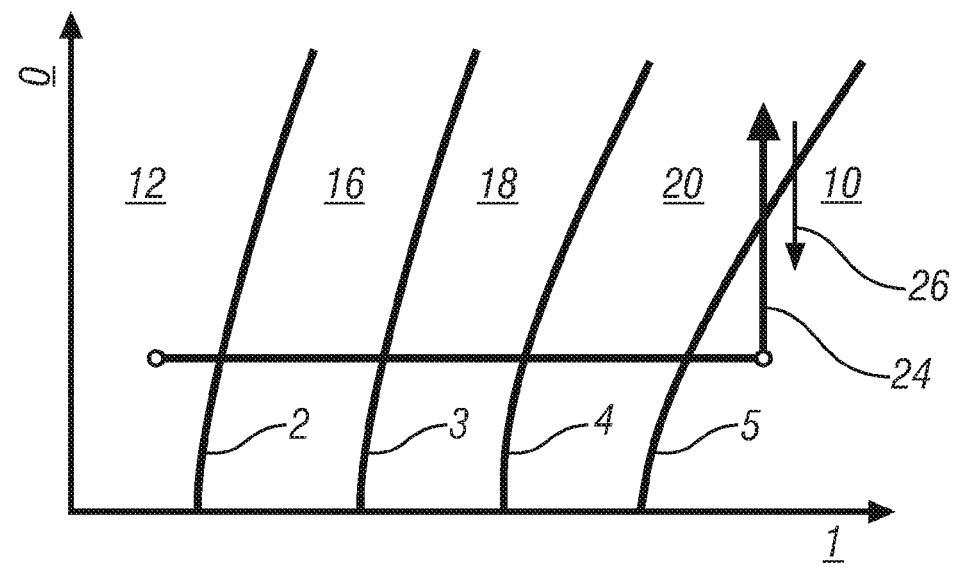

Referring now to the drawings, wherein the showings are for the purpose of illustrating certain exemplary embodiments only and not for the purpose of limiting the same, FIGS. 1A and 1B illustrate a phase diagram of critical stresses for conversion of austenite-martensite crystal transformations as functions of temperature for a shape memory alloy (SMA). The axis of abscissa 1 represents temperature and the axis of ordinate 0 represents stress ($\sigma$). SMAs have the characteristic of very large recoverable strains due to crystallographic transformations between martensite and austenite. As a result, SMAs are desirable because they provide large shape changes or large force generation.

Figure 2:
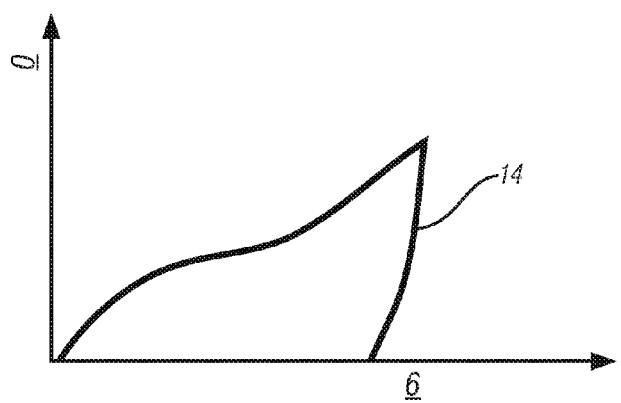
FIG. 2 is a diagram of stress and strain of a material, in accordance with the present disclosure.

FIG. 2 graphically illustrates stress ($\sigma$) and strain ($\epsilon$) of a material. The axis of abscissa 6 represents the strain ($\epsilon$) and the axis of ordinate 0 represents the stress ($\sigma$). As shown, the temperature dependent strain is recovered either in a hysteresis loop upon heating 14 or upon unloading the material. This capability for reversible, controllable large strains is the basis of interest in selecting SMAs as actuator materials. Large shape changes may be induced easily with these materials. In a constrained situation, large stresses may be imparted to the connected structural components.

Referring to FIGS. 1A and 2, SMA behavior is due to a reversible thermoelastic crystalline phase transformation between a high symmetry parent phase, austenite 10, and a low symmetry product phase, martensite 12. The phase changes between austenite 10 and martensite 12 occur as a result of both stress and temperature. Formation of the martensitic phase 12 under stress 13 results in the formation of preferred crystalline variant orientations which leads to a large induced strain.

Referring to FIG. 1B, under a static load and at a sufficiently low temperature, the material is stabilized at martensite 12. At a sufficiently high temperature, the material is stabilized at austenite 10. Martensite start (Ms) 3 and finish (Mf) 2 indicate temperatures where the phase transformation to martensite 12 starts and finishes, respectively. Austenite start (As) 4 and finish (Af) 5 indicate temperatures where the phase transformation to austenite 10 starts and finishes, respectively. At temperatures below Mf 2, an SMA material is stable in the martensite 12 phase. When an SMA material in the martensite 12 phase is heated under constant stress, the transformation to the austenite phase 10 begins only when the temperature exceeds As 4 at a third zone 20. From this point, the material progressively transforms to the austenite phase 10 until the transformation is complete at Af 5. As shown in FIG. 1B, at temperatures above Af 5, the material is stable in the austenite 10 phase at this static stress 22. However, applying a sufficient load 24 to the material may induce a solid-state, diffusionless transformation from austenite 10 to tensile (or detwinned) martensite thereby resulting in an induced strain to the material. During subsequent unloading 26 at the same temperature the material reverts to austenite 10, wherein the strain is wholly or partially recovered.

Figure 3:
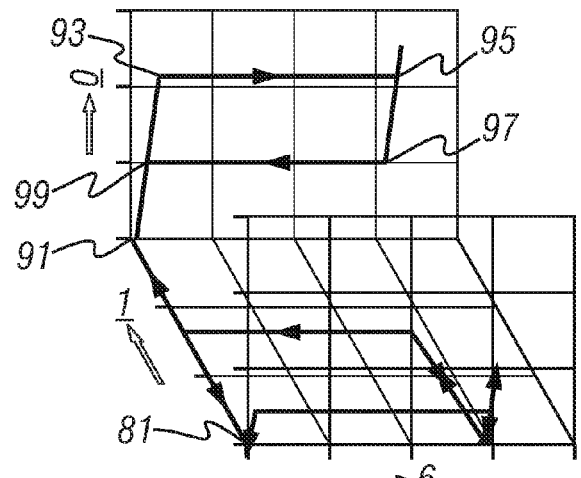
FIGS. 3 and 4 each show a three-dimensional graphical representation indicating stress ($\sigma$) 0, strain ($\epsilon$) 6, and temperature (T(° C.)) 1 for a wire or cable fabricated from an exemplary SMA material that exhibits both shape memory effect and superelastic effect under different conditions of load and temperature, in accordance with the present disclosure.

Referring to FIG. 3, a three-dimensional graphical representation indicating stress ($\sigma$) 0, strain ($\epsilon$) 6, and temperature (T(° C.)) 1 for a wire or cable fabricated from an exemplary SMA material that exhibits both shape memory effect and superelastic effect under different conditions of load and temperature is illustrated. Between reference points 81 and 91, previously induced strain at lower temperature is recovered with an increase in temperature. Between reference points 91 and 93, a tensile load is applied to the SMA cable or wire in its austenite phase, yielding a strain between reference points 91 and 95. While remaining at a constant temperature, the SMA cable or wire is partially unloaded between reference points 95 and 91, wherein a majority of the induced strain is recovered between reference points 97 and 99. While still remaining at the constant temperature, the SMA cable or wire is completely unloaded between reference points 99 and 91, wherein the strain is wholly recovered in the austenite phase. Between reference points 91 and 81, the SMA cable or wire is cooled to a material specific temperature, wherein the material changes phase from the austenite phase to martensite phase. Thus, SMA material may be applied to effect a shape change that is induced in response to an activation signal, e.g., an energizing electric current that causes one of a thermal increase and a thermal decrease in the SMA material. As described below, in a physical constraint application, an SMA material may be applied to induce stress between connected structural members in response to the activation signal.

Figure 4:
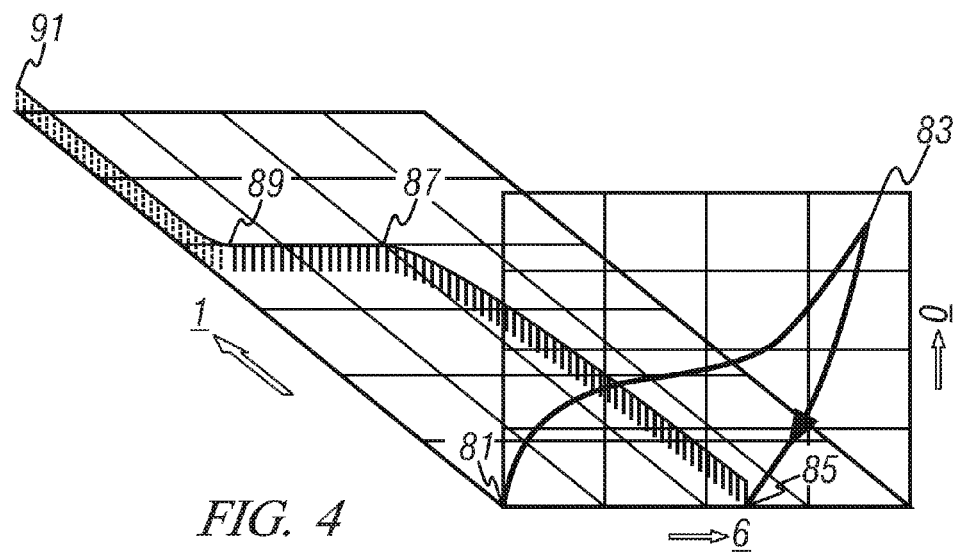

Referring to FIG. 4, a three-dimensional graphical representation indicating stress ($\sigma$) 0, strain ($\epsilon$) 6, and temperature (T(° C.)) 1 for a wire or cable fabricated from an exemplary SMA material that exhibits both shape memory effect and superelastic effect under different conditions of load and temperature is illustrated in accordance with the present disclosure. Between reference points 81 and 83 a load is applied to an SMA material in its martensite phase, yielding a strain. While remaining at a static temperature, the material is unloaded between reference points 83 and 85. The load-unload cycle between reference points 81-85 results in a material stabilized in the martensite phase and having an induced strain. Increasing the temperature of the material results in a relatively static strain between reference points 85 and 87. However, between reference points 87 and 89 the strain decreases (i.e., recovers) rapidly at a material specific temperature, wherein the transformation from martensite to austenite occurs. At reference point 91, the transformed material is stabilized in the austenite phase. Upon cooling from austenite to martensite, little, if any, strain (or shape change) is usually observed, unless, the material has been heavily processed to have a so-called two-way shape memory effect. An alternative to using an SMA material with two-way shape memory effect involves the use of a biasing member to induce strain on the material upon cooling.

Figure 5:
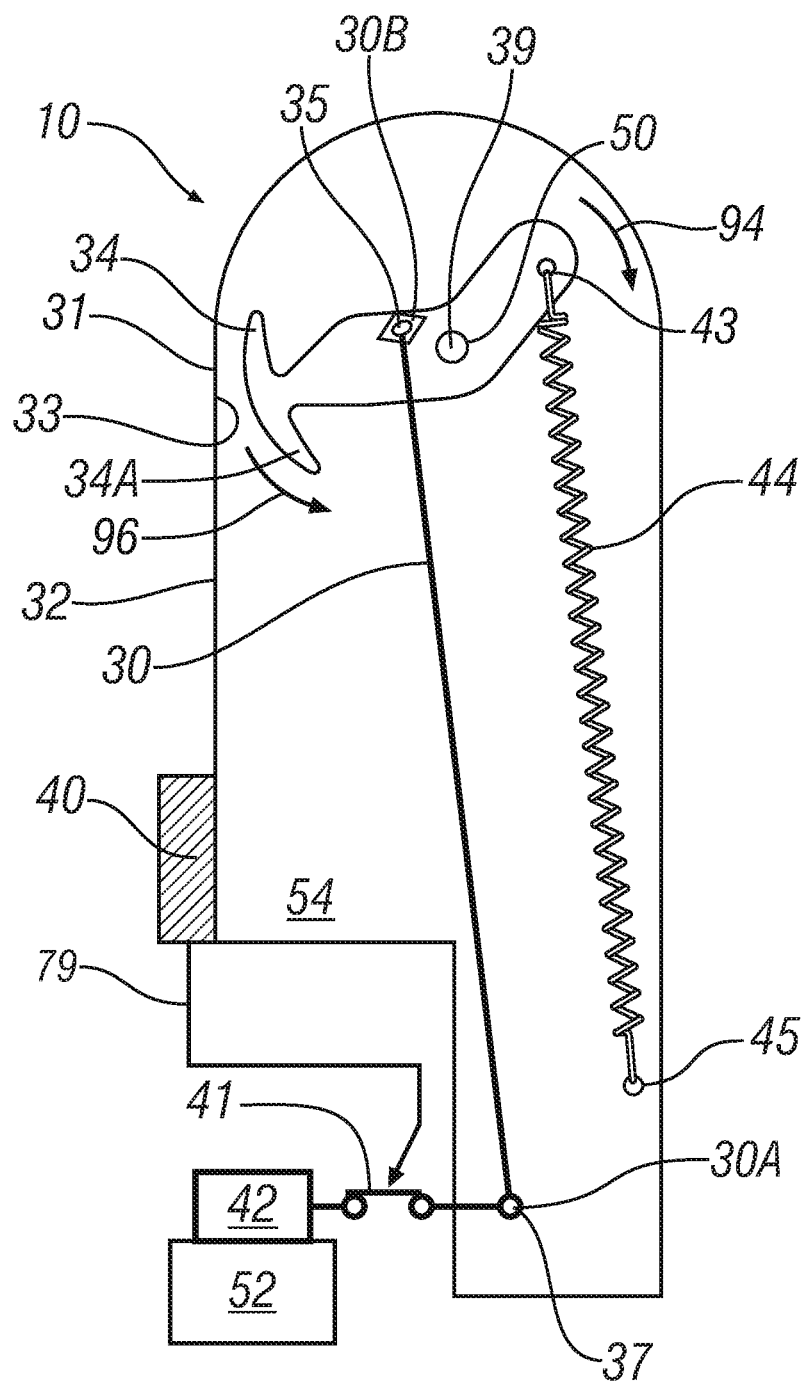
FIG. 5 illustrates an actuator system for a device including a housing with a rotatable element connected to a linear SMA actuator, in accordance with the present disclosure.

FIG. 5 shows an actuator system for a device 10 configured in accordance with an embodiment of the present disclosure. The device 10 includes a housing 32 including a rotatable element 34 pivotably mounted in the housing 32 at an axle 39. The housing 32 includes inner and outer surfaces 31, 33, respectively. The rotatable element 34 may be enclosed within the inner surface 31 of the housing 32. The actuator system includes a linear SMA actuator 30 electrically connected to an activation controller 40. The linear SMA actuator 30 connects to one side of the rotatable element 34, and a mechanical biasing member 44 mechanically couples to the rotatable element 34 on an opposed side relative to the axle 39. The linear SMA actuator 30 and the biasing member 44 apply opposed tensile forces across a pivot point corresponding to the axle 39 resulting in opposed torque arms. A position feedback sensor 50 is configured to monitor the position of the rotatable device 34, e.g., a rotational position. The activation controller 40 monitors a signal input from the position feedback sensor 50 and generates an activation signal $V_{CMD}$ that controls an energizing current to activate the linear SMA actuator 30.

The linear SMA actuator 30 includes a wire or cable fabricated from active material that may include an SMA material. A first end 30A of the linear SMA actuator 30 mechanically couples to a fixed anchor point 37 on the device 10. A second end 30B of the linear SMA actuator 30 mechanically couples to a fixed anchor point 35 on the rotatable device 34. The linear SMA actuator 30 induces a torque on the rotatable device 34 relative to the axle 39 when activated, causing an element 34A of the rotatable device 34 to rotate. Alternative embodiments of active materials include electroactive polymers (EAPs), piezoelectric, magnetostrictive and electrorestrictive materials. It will be appreciated that active material members may be utilized in a wide variety of shapes depending upon the desired function of the device and the activation force required of the member.

The activation controller 40 electrically connects to the linear SMA actuator 30 at the first end 30A and at the second end 30B and generates the activation signal $V_{CMD}$ 79 that controls the energizing current to activate the linear SMA actuator 30. In one embodiment, the energizing current controlled by the activation signal $V_{CMD}$ 79 passes through the linear SMA actuator 30 and causes a temperature change therein to induce strain in the linear SMA actuator 30, causing it to either physically extend or retract the end 30B relative to the first end 30A, thus inducing the torque on the rotatable device 34 to linearly translate the fixed anchor point 35 relative to the fixed anchor point 37 on the device 10. The activation signal $V_{CMD}$ 79 may be used, e.g., to control overall magnitude of electric current associated with the energizing current, or to control an average or RMS magnitude of electric current associated with the energizing current when the electric current is pulse width-modulated or otherwise alternating. It is appreciated that there are other embodiments to provide the activation signal $V_{CMD}$ 79 to control the energizing current.

In one embodiment, the activation controller 40 electrically connects to a switch device 41 to control the energizing current to the linear SMA actuator 30 in response to the activation signal $V_{CMD}$ 79. The switch device 41 controls the energizing current by controlling electric current flow from an energy storage device 42, e.g., a battery, to the first end 30A of the linear SMA actuator 30 at the fixed anchor point 37 via a wiring harness. As depicted, the switch device 41 is in an activated state. The switch device 41 may take any suitable form including a mechanical, electromechanical, power switch device or solid-state device, e.g., IGBT and MOSFET devices.

The biasing member 44 connects to the rotatable device 34 and includes a mechanical spring device in one embodiment with first and second ends 43 and 45, respectively. The first end 43 is mechanically coupled to the rotatable device 34 and the second end 45 is mechanically anchored to the inner surface 31 of the housing 32.

The position feedback sensor 50 is used to monitor a position of the rotatable device 34 from which a present position ($P_M$) associated with the element 34A may be determined. The position feedback sensor 50 may be signally connected to the activation controller 40. The position feedback sensor 50 may be a rotary position sensor attached to the axle 39 and may be configured to measure rotational angle of the rotatable device 34 in one embodiment. In one embodiment, the rotary position sensor 50 may be a potentiometer configured to provide feedback position, and is integrated into the housing 32 of the device 10. Alternatively, other feedback sensors may monitor one of a rotational angle, a linear movement and electric resistance through the linear SMA actuator 30 to obtain the current position. Other sensors providing signal inputs to the activation controller 40 include a voltage monitoring sensor to monitor output voltage ($V_B$) of the energy storage device 42 and a temperature monitoring sensor to monitor ambient temperature ($T_A$) at or near the linear SMA actuator 30.

The rotatable device 34 rotates about the axle 39 when the linear SMA actuator 30 linearly translates the second end 30B relative to the first end 30A in response to the activation signal $V_{CMD}$ 79 from the activation controller 40, changing the position of the element 34A.

In the embodiment shown, the linear SMA actuator 30 linearly translates the rotatable device 34 at the fixed anchor point 35. The linear translation at the fixed anchor point 35 causes the rotatable device 34 to rotate around the axle 39, causing rotation of the element 34A. It will be appreciated that alternative embodiments may involve linear translation of devices connected to the linear SMA actuator 30 and associated rotations and translations.

When the linear SMA actuator 30 is deactivated the biasing member 44 exerts a biasing force 94 on the rotatable device 34, producing a stress imposing a strain on the linear SMA actuator 30 and thereby stretching the linear SMA actuator 30. It should be appreciated that when the linear SMA actuator 30 is deactivated the switch 41 is also deactivated and in an open position. When the linear SMA actuator 30 is activated the linear SMA actuator 30 recovers imposed strain associated with the biasing member, and exerts an opposing force 96 on the biasing member 44, overcoming the biasing force 94 and rotating the rotatable device 34 about the axle 39 and rotating or linearly translating the element 34A. The activation controller 40 is configured to receive a reference signal or a command signal ($P_C$), and generate the activation signal $V_{CMD}$ 79 in response to the reference signal and the feedback signal indicating the present position ($P_M$) associated with the element 34A. The command signal ($P_C$) may include a predetermined discrete position associated with the element 34A, e.g., opened or closed. Alternatively, the command signal ($P_C$) may include a linear position associated with the element 34A, e.g., a percent-opened or percent-closed position. The command signal ($P_C$) may be generated by another control scheme, or may be generated by an operator via a user interface. The command signal ($P_C$) may activate or deactivate the device 10 in response to vehicle conditions. Non-limiting examples of vehicle conditions that generate the command signal ($P_C$) include a door-opening or door-closing event and a hatch opening or hatch closing event.

The activation controller 40 compares a present position feedback signal indicating the present position ($P_M$) associated with the element 34A and the command signal ($P_C$), and generates the activation signal $V_{CMD}$ 79 correspondingly. The activation signal $V_{CMD}$ 79 is used to generate an energizing current across the linear SMA actuator 30 by controlling electric power using pulse width-modulation (PWM) or voltage regulation thereto. The activation controller 40 may include a microcontroller to execute a control scheme and an electric circuit to generate the activation signal $V_{CMD}$ 79 that is communicated to a power stage, e.g., a PWM controller to enable and disable the energizing current flowing through the linear SMA actuator 30. A time-based derivative of the present position feedback signal indicating the present position ($P_M$) may be used for overload protection and precise control.

Figure 6:
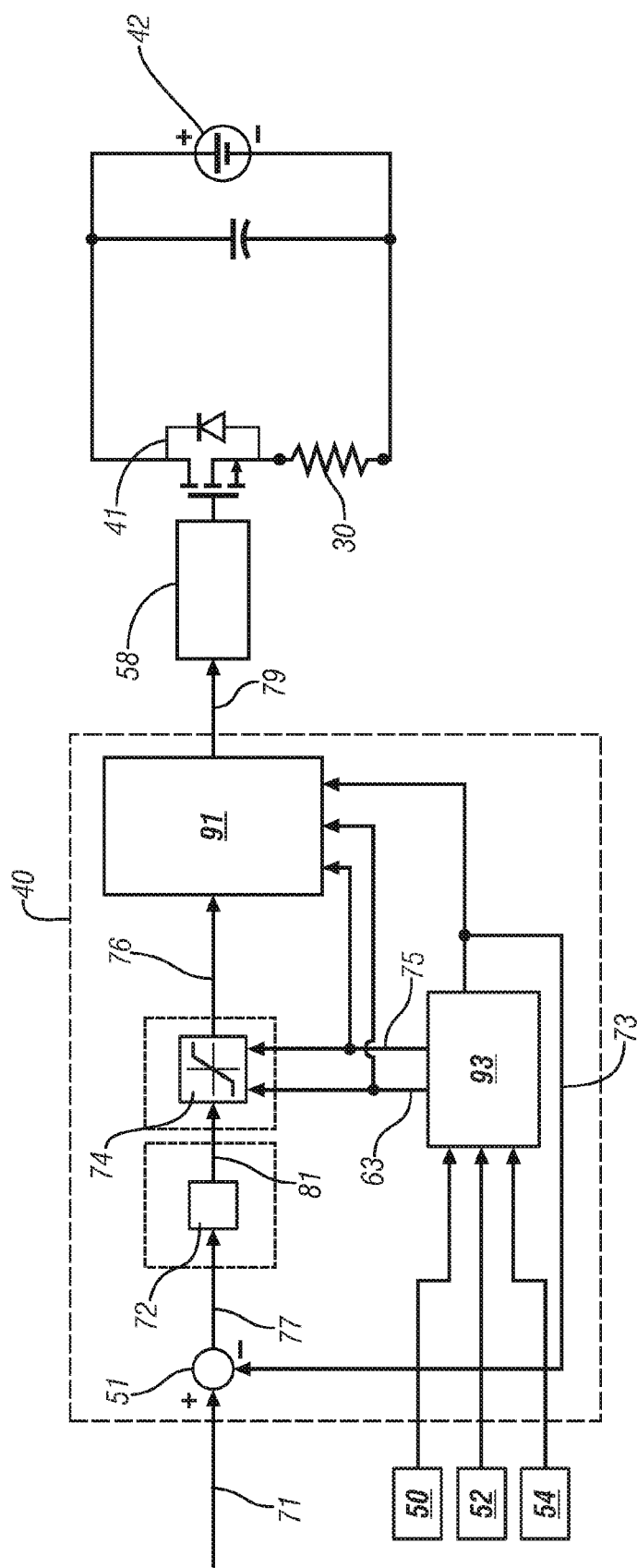
FIGS. 6 and 7 each illustrate a detailed schematic diagram of a control circuit including an activation controller to control position of a device using a linear SMA actuator, in accordance with the present disclosure.

FIG. 6 shows a detailed schematic diagram of an embodiment of a control circuit for the activation controller 40 to control position of a device, e.g., to control position of element 34A of the rotatable device 34. The activation controller 40 includes a control circuit to generate the activation signal $V_{CMD}$ 79 to control a PWM generator 58 that controls the energizing current to the linear SMA actuator 30 via switch device 41. Alternatively, the activation controller 40 includes a control circuit to generate the activation signal $V_{CMD}$ 79 that includes a voltage regulator device that controls the energizing current to the linear SMA actuator 30.

A command signal 71 is generated, which may be a command signal associated with a preferred position of a device, e.g., a preferred position of element 34A of rotatable device 34. The position feedback sensor 50 measures the present position feedback signal 73 which is input to a signal processing circuit 93, from which a present position ($P_M$) of an element of interest, e.g., position of element 34A of rotatable device 34 is determined. The signal processing circuit 93 also monitors signal inputs from a supply voltage sensor 52 and an ambient temperature sensor 54 to determine voltage potential ($V_B$) 63 and ambient temperature (T) 75, respectively.

The present position ($P_M$) and the preferred position ($P_C$) (i.e., the present position feedback signal 73 and the command signal 71, respectively) are compared using a difference unit 51 that determines a position difference or error signal 77 that is input to an error amplifier 72. The error amplifier 72 may include a PI controller, and generates an amplified signal 81 that is communicated to a signal limiter 74. The signal limiter 74 imposes limits on the amplified signal 81 to generate the control signal 76, the control signal 76 including maximum and minimum control signal values associated with the voltage potential ($V_B$) 63 and the ambient temperature (T) 75. An overload protection scheme 91 monitors the control signal 76 in context of the voltage potential ($V_B$) 63 output from the energy storage device 42, the ambient temperature (T) 75, and the present position feedback signal 73 indicating the present position ($P_M$) of element 34A of rotatable device 34 to detect an mechanical overload condition and execute overload protection to prevent commanding a control signal that may mechanically overload the linear SMA actuator 30. A final control signal, i.e., the activation signal $V_{CMD}$ 79 includes a duty cycle control signal for controlling the linear SMA actuator 30 that is output to an actuator, e.g., one of the PWM generator 58 and associated switch device 41. Alternatively, the activation signal $V_{CMD}$ 79 including the voltage control signal for controlling the linear SMA actuator 30 may be output to a voltage regulator or a current regulator. An exemplary overload protection scheme is described with reference to FIG. 14.

Figure 7:
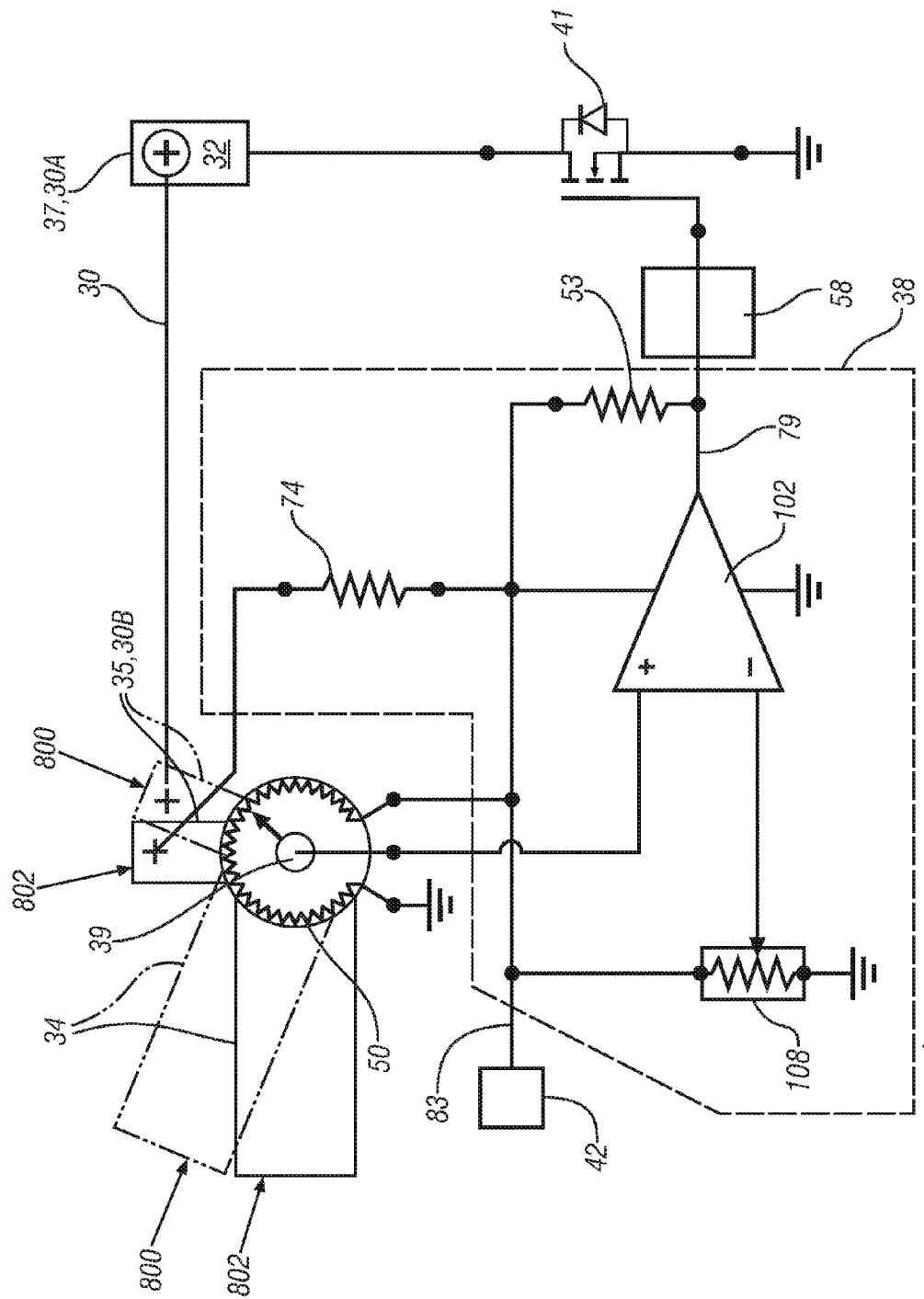

FIG. 7 is a schematic diagram showing details of an embodiment of a control circuit 38 used by the activation controller 40 to control the energizing current transferred to the linear SMA actuator 30, including the position sensor 50. The position sensor 50 may be a potentiometer device configured to operate as a rotary position sensing device as depicted. The control circuit 38 includes a linear comparator device 102, which may be an operational amplifier in one embodiment. The energy storage device 42 supplies an output voltage ($V_C$) 83 to provide electric power to the position sensor 50 and the linear comparator device 102. The controllable output voltage ($V_C$) 83 may be 0 V DC, which deactivates the control circuit 38 to control the linear SMA actuator 30 in an extended state 800 with corresponding rotation of the rotatable element 34. The controllable output voltage ($V_C$) 83 may be 5 V DC or another suitable voltage level to activate the control circuit 38 to control the linear SMA actuator 30 in a retracted state 802 with corresponding rotation of the rotatable element 34.

When the energy storage device 42 controls the output voltage ($V_C$) 83 to activate the control circuit 38, electric power is provided to the linear SMA actuator 30, causing it to retract. The position sensor 50 generates a signal input to the positive (+) input of the linear comparator device 102. A signal input to the negative (−) input of the linear comparator device 102 is a calibratable reference voltage that may be set using a variable resistor device 108 that forms a voltage divider. It is appreciated that the reference voltage input to the negative (−) input of the linear comparator device 102 may be generated using other devices and methods. The reference voltage to the negative (−) input of the linear comparator device 102 controls the linear SMA actuator 30 to a predetermined length associated with the retracted state 802 and correspondingly rotates the rotatable element 34 when the control circuit 38 is activated by providing electric power via the energy storage device 42. The comparator 102 generates an output voltage that corresponds to the activation signal $V_{CMD}$ 79 that may be input to an optional circuit driver 58 in one embodiment. The signal limiter 74, which is in the form of a resistor device in one embodiment, is electrically connected between the second end 30B of the linear SMA actuator 30 and the energy storage device 42. There is a pull-up resistor 53 electrically connected between the energy storage device 42 and the output pin of the comparator 102.

The linear SMA actuator 30 includes first and second ends 30A and 30B, respectively wherein the second end 30B is mechanically coupled to the fixed anchor point 35 on the rotatable device 34 and the first end 30A is mechanically anchored to the fixed anchor point 37 on an inner surface of housing 32. The feedback voltage from the position sensor 50 is input to comparator 102, wherein the feedback voltage is compared to the reference voltage. The comparator device 102 signally connects to the optional circuit driver 58 and generates the activation signal to control switch device 41 to control electric power to the linear SMA actuator 30 responsive to the activation signal $V_{CMD}$. The comparator 102 is configured to control the energizing current and associated material temperature and therefore the length of the linear SMA actuator 30. Because the feedback voltage from the position sensor 50 is used to control the length of the linear SMA actuator 30, any outside forces such as temperature or air currents are internally compensated. In operation, so long as the feedback voltage from the position sensor 50 is less than the reference voltage, the activation signal $V_{CMD}$ 79 controls the switch device 41 to transfer the energizing current across the linear SMA actuator 30. When the feedback voltage from the position sensor 50 is greater than the reference voltage, the activation signal $V_{CMD}$ 79 output from the comparator 102 drops to zero, serving to deactivate the switch device 41 to interrupt and discontinue the energizing current across the linear SMA actuator 30. The rotatable element 34 is shown in the first position 800 associated with the deactivated state and the second position 802 associated with the activated state, which correspond to the reference voltage of the voltage divider 108 at 0 V DC and 5 V DC, respectively, in one embodiment.

Figure 8A:
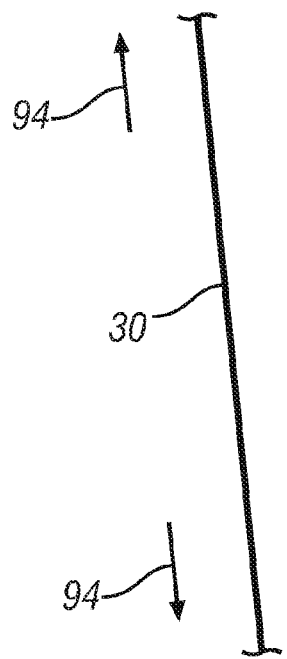
FIGS. 8A and 8B illustrate detailed views of stress ($\sigma$), strain ($\epsilon$) and strain recovery ($\epsilon_{REC}$) on an SMA actuator when the SMA actuator is activated and deactivated, in accordance with an exemplary embodiment of the present disclosure.
Figure 8B:
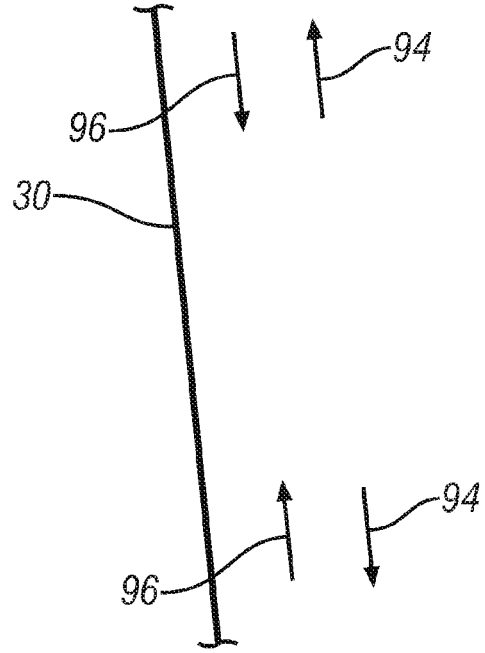

In accordance with an exemplary embodiment of the present disclosure, FIGS. 8A and 8B illustrate detailed views of stress (σ), strain (ε) and strain recovery ($\epsilon_{REC}$) on the SMA actuator 30 when the SMA actuator 30 is activated and deactivated. It will be appreciated that FIG. 8A corresponds to the SMA actuator 30 being deactivated, i.e., in the extended state 800. FIG. 8B corresponds to the SMA actuator 30 being activated, i.e., in the retracted state 802. It should be appreciated that the SMA actuator 30 may include an SMA material chosen such that the ambient or operating temperature of the SMA actuator 30 is less than the austenite start temperature of the SMA material. Hence, when the SMA actuator 30 is deactivated, and not electrically heated, the SMA actuator 30 remains in the martensite phase and is protected against accidental actuation due to a rise in the ambient temperature.

Referring to FIG. 8A, when the linear SMA actuator 30 is deactivated the biasing member 44 exerts a biasing force 94 on the rotatable device 34, producing a stress (σ) imposing a strain(ε) on the linear SMA actuator 30 and thereby stretching the linear SMA actuator 30 to the extended state 800. It should be appreciated that when the linear SMA actuator 30 is deactivated, the switch 41 is also deactivated and in an open position. It is further appreciated that the position feedback sensor 50 measures the present position feedback signal which is input to the signal processing circuit 93, from which the present position ($P_M$) 73 of element 34A of rotatable device 34 is determined.

Referring to FIG. 8B, when the SMA actuator 30 is activated, the SMA actuator recovers imposed strain($\epsilon_{REC}$) associated with the biasing member, and exerts the opposing force 96 on the biasing member 44, overcoming the biasing force 94 and rotating the rotatable device 34 about the axle 39 and rotating or linearly translating the element 34A. It should be appreciated that the position feedback sensor 50 measures the present position feedback signal which is input to the signal processing circuit 93, from which the present position ($P_M$) 73 of element 34A of rotatable device 34 is determined.

Figure 9:
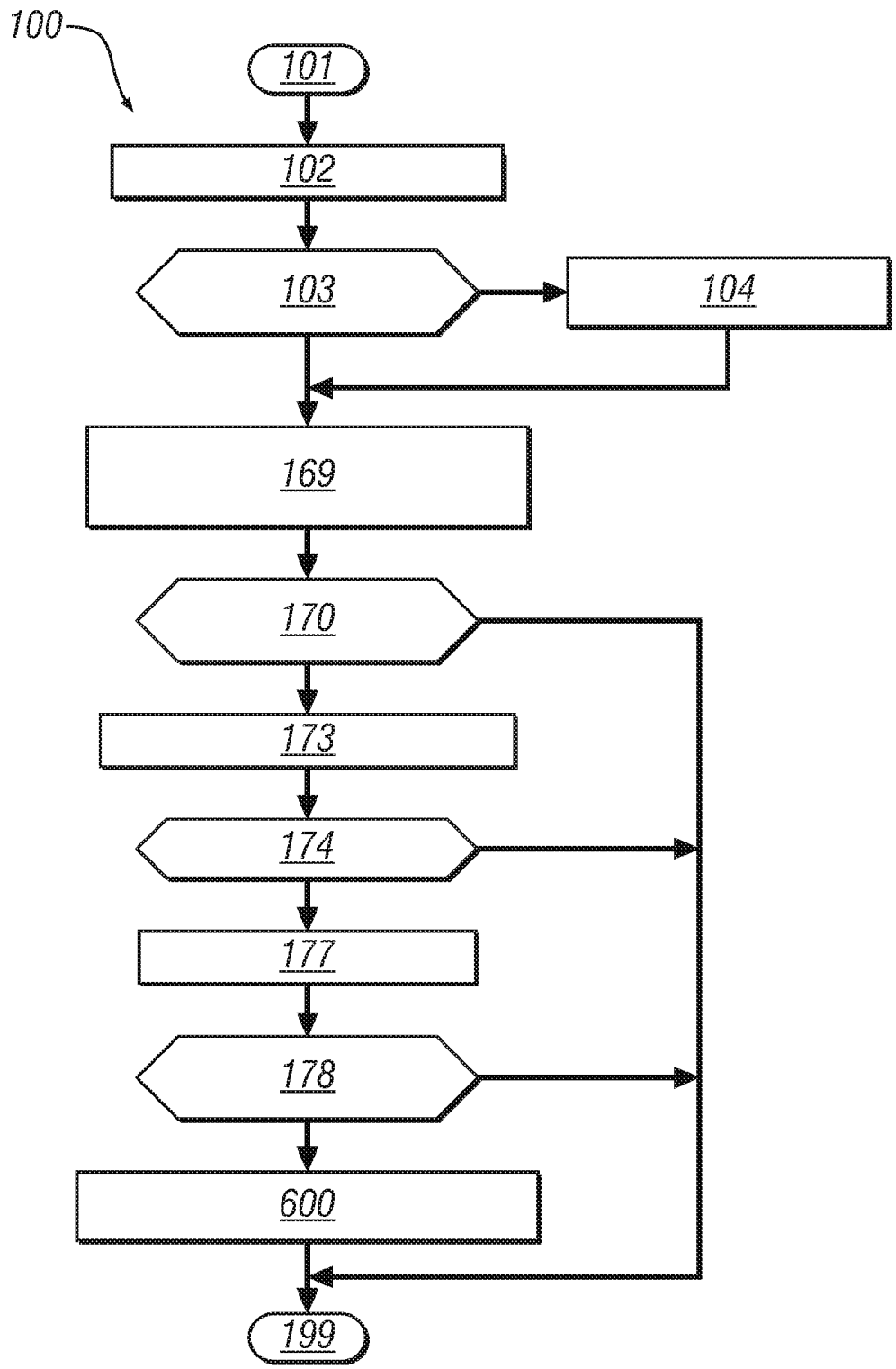
FIGS. 9-11 illustrate various control schemes used to detect the development of an overload condition in the linear SMA actuator when a high energizing current level is applied across the linear SMA actuator for providing activation in response to an activation signal over a period of time, in accordance with the present disclosure.
Figure 10:
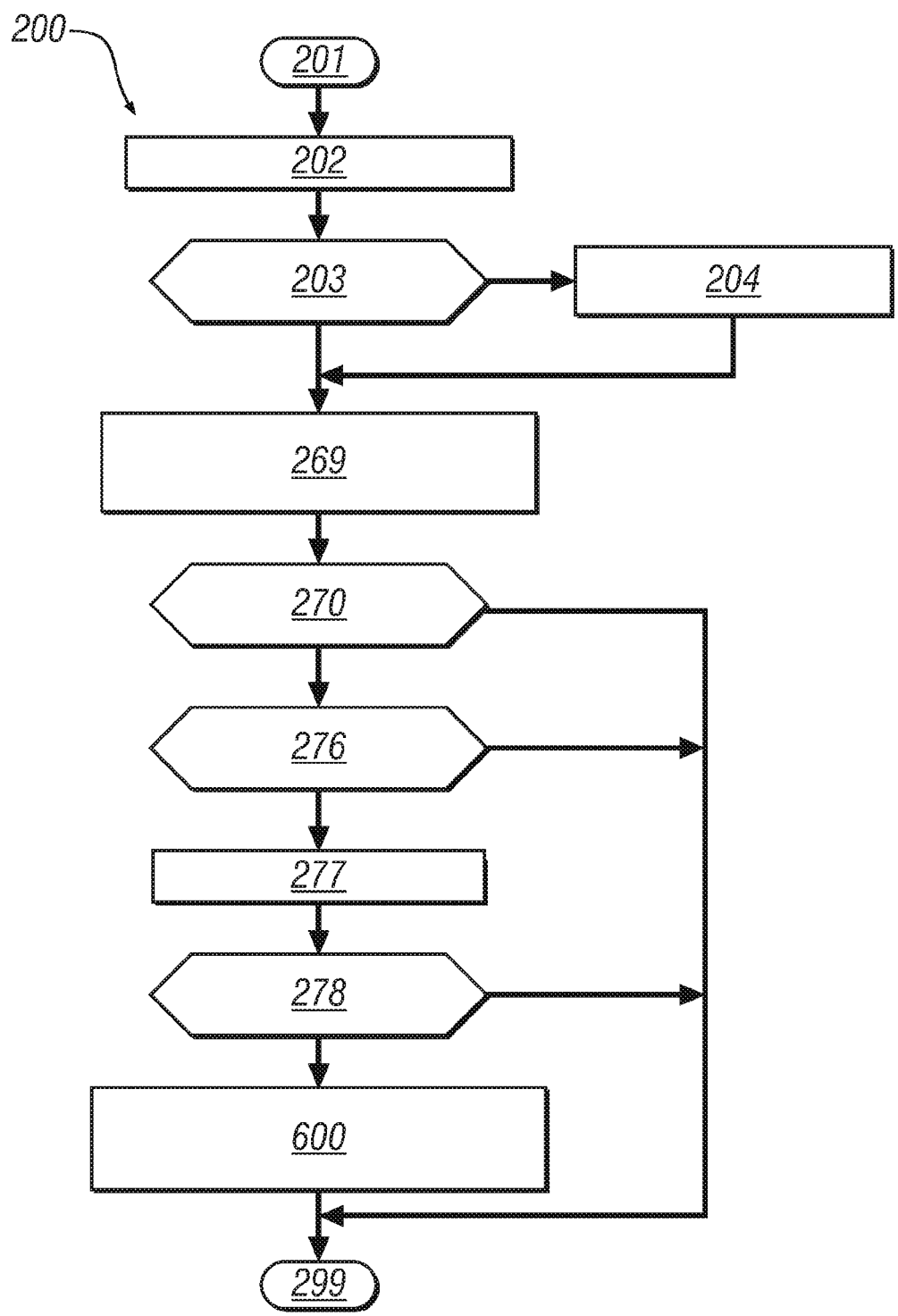
Figure 11:
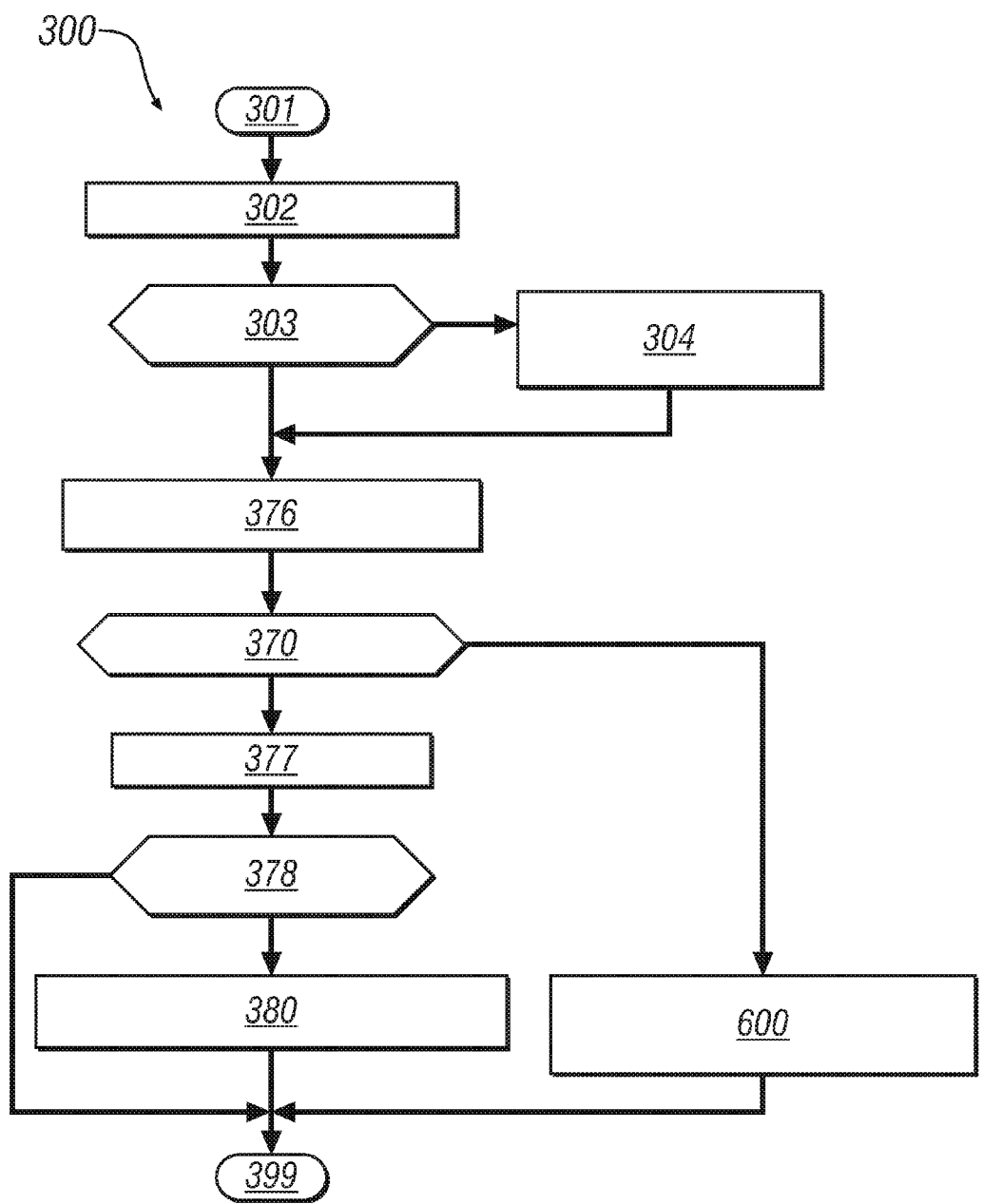

In accordance with exemplary embodiments of the present disclosure, FIGS. 9-11 illustrate various control schemes used to detect the development of an overload condition in the linear SMA actuator 30 when a high energizing current level is applied across the linear SMA actuator 30 for providing actuation over a period of time by controlling electric power using pulse width-modulation (PWM), current regulation or voltage regulation thereto.

It is appreciated that it takes time to heat the linear SMA actuator 30 before the actuator begins to change position or any feedback variation occurs. This initial heating time varies. In a non-limiting example, the initial heating time is about one second. During this period, the error may be large and feedback variation is equal to zero. Hence, because it is undesirable to trigger overload during the heating period, an initial delay period is utilized where error or feedback variation is measured. The initial delay period may be configured to allow residual heat across the energized linear actuator to decrease reducing false overload condition detection due to low feedback variation. The initial delay period may be variably selected including selecting a longer initial delay period when substantially no residual heat is retained across the linear actuator prior to energizing and selecting a shorter initial delay period when residual heat is retained across the linear actuator prior to energizing.

Embodiments envisioned in control schemes 100 and 200 (FIGS. 9 and 10, respectively) include executing an overload protection scheme when an overload condition is detected. It is understood that detecting overload conditions may be based on predefined windows where detection of an overload condition must be met for a specified number of times within a window. Likewise, a moving window may be used when each one of the samples in a window meets overload condition criteria, the samples meeting overload condition criteria are recorded in the activation controller 40. The count is updated based on the oldest and the most recent samples. The overload protection scheme may be executed when the overload condition is met a specified number of times within the moving window. Alternatively, overload conditions may be detected in a time-based manner without utilizing predefined windows.

Referring to FIGS. 6 and 9, a control scheme 100 detects an overload condition by monitoring position feedback variation based upon the difference between the present position feedback signal 73 and a previous position feedback signal and monitoring the error signal 77 based upon the difference between the present position feedback signal 73 (e.g., a present position $P_M$ of element 34 A of rotatable device 34) and the command signal 71 (e.g., a preferred position of element 34A of rotatable device 34). As aforementioned, the error signal 77 is an input signal utilized in the generation of the activation signal $V_{CMD}$ 79 that includes a voltage level control signal or pulse width-modulated signal pulses for controlling the linear SMA actuator 30. As aforementioned, the energizing current across the linear SMA actuator 30 increases the temperature across the linear SMA actuator to control the length of the linear SMA actuator 30 to move element 34A of rotatable device 34 to a preferred position.

The control scheme 100 starts and a window time counter is increased at blocks 101 and 102, respectively. The window time counter is compared to a window time threshold at decision block 103. If the rest time counter is greater than the window time threshold, an overload time counter and the window time counter are reset to zero at block 104 before proceeding to decision block 169. If the window time counter is less than the window time counter threshold, the control scheme 100 proceeds to block 169 where the position feedback variation is monitored based upon the present position feedback signal 73 and the previous position feedback signal. The window time threshold is selected as a period of time when initial values and parameters required for monitoring and detecting an overload condition are reset. For example, the overload time counter and the window time counter may be reset every second. Referring to decision block 170, the position feedback variation is compared to a position feedback variation threshold. If the position feedback variation signal is greater than the position feedback variation threshold, the control scheme 100 ends at block 199 because an overload condition has not been detected. If the position feedback variation signal is less than the position feedback variation threshold, the control scheme proceeds to block 173 where the error signal 77 is monitored. It is understood that if the position feedback variation is less than the position feedback variation threshold, the change in present position $P_M$ of element 34 A of rotatable device 34 during activation of the linear SMA actuator is too slow indicating a blockage or interruption of activation of the linear SMA actuator 30. This blockage or interruption of activation of the linear SMA actuator 30 may be the result of an overload condition due to the applied energizing current across the linear SMA actuator 30 for too long. The position feedback variation threshold may be variably dependent upon a desired activation time to move the movable element 34 A of rotatable device 34 to the preferred position. It is further understood that the position feedback variation threshold may include a range of permissible limits including selecting a lower feedback variation threshold limit when the desired activation time to move the movable element is long, and selecting an upper feedback variation threshold limit when the desired activation time to move the movable element is short. Referring to decision block 174, the error signal 77 is compared to an error threshold. If the error signal 77 is less than the error threshold, the control scheme 100 ends at block 199 because an overload condition has not been detected. If the error signal 77 is greater than the error threshold, the control scheme 100 proceeds to block 177 where the overload time counter is increased. The error threshold is selected as an acceptable or tolerable error based on the difference between the present position feedback signal 73 (e.g., a present position $P_M$ of element 34 A of rotatable device 34) and the command signal 71 (e.g., a preferred position of element 34A of rotatable device 34). For instance, the command signal 71 may command a preferred position of element 34 A of rotatable device 34 to rotate to a rotational angle of 60 degrees, whereas the present position feedback signal 73 only indicates the present position PM of element 34A of rotatable device to be 55 degrees, thus resulting in an error signal 77 of 5 degrees. If the error threshold were selected as 4 degrees, the error signal 77 would be greater than the error threshold indicating possible overload. It should be appreciated that the error threshold may include a range of permissible limits including selecting a lower threshold limit to substantially reduce premature detection of an overload condition, and selecting an upper threshold limit to substantially conform to the preferred position of the movable element.

Referring to decision block 178, the overload time counter is compared to an overload time threshold. The overload time threshold is selected as a sufficient period of time to detect an overload condition when the control scheme 100 has determined that the position feedback variation less than the position feedback variation threshold (e.g., block 170) and the error signal 77 greater than the error threshold (e.g., block 174) have occurred enough times within the window time period. The overload time threshold may be variable and selected based on overload cycle life and operating cycle life associated with the material of the linear SMA actuator 30. If the overload time counter is less than the overload time threshold, the control scheme 100 ends at block 199 because an overload condition has not been detected. If the overload time counter is greater than the overload time threshold, an overload condition is detected, and overload protection (i.e., overload protection scheme 600 shown in FIG. 12) may be utilized to prevent the development of the overload condition in the linear SMA actuator 30. In other words, for an overload condition to be detected, the position feedback variation must be less than the position feedback variation threshold and the error signal 77 must be greater than the error threshold a number of predetermined times (i.e., windows) within the window time period.

Referring to FIGS. 6 and 10, control scheme 200 detects an overload condition by monitoring position feedback variation based upon the difference between the present position feedback signal 73 and a previous position feedback signal and monitoring the control signal 76 based upon the present position feedback signal 73 (e.g., a present position $P_M$ of element 34A of rotatable device 34) and the command signal 71 (e.g., a preferred position of element 34A of rotatable device 34). As aforementioned, the control signal 76 is an input signal generated by the signal limiter 74 and utilized in the generation of the activation signal $V_{CMD}$ 79 that includes a voltage level control signal or pulse width-modulated signal pulses for controlling the linear SMA actuator 30. The control signal 76 further includes maximum and minimum control signal values associated with the voltage potential ($V_B$) 63 and the ambient temperature (T) 75. As aforementioned, the ambient temperature (T) 75 is measured at or substantially near the linear SMA actuator and the voltage potential ($V_B$) 63 corresponds to the electrical energy storage device for supplying the energizing current for controlling the linear SMA actuator 30.

The control scheme 200 starts and a window time counter is increased at blocks 201 and 202, respectively. The window time counter is compared to a window time threshold at decision block 203. If the window time counter is greater than the window time threshold, than the window time counter and an overload time counter are set to zero at block 204 before proceeding to decision block 269. If the window time counter is less than the window time threshold, the control scheme 200 proceeds to block 269 where the position feedback variation is monitored based upon the present position feedback signal 73 and the previous position feedback signal. The window time threshold is selected as a period of time when initial values and parameters required for monitoring and detecting an overload condition are reset. For example, the overload time counter and the window time counter may be reset every second. Referring to decision block 270, the position feedback variation is compared to a position feedback variation threshold. If the position feedback variation is greater than the position feedback variation threshold, the control scheme 200 ends at block 299 because an overload condition has not been detected. If the position feedback variation is less than the position feedback variation threshold, the control scheme proceeds to decision block 276 where the control signal 76 is monitored and compared to a control signal threshold. It is understood that if the position feedback variation is less than the position feedback variation threshold, the change in preset position $P_M$ of element 34 A of rotatable device 34 during activation of the linear SMA actuator is too slow indicating a blockage or interruption of activation of the linear SMA actuator 30. This blockage or interruption of activation of the linear SMA actuator 30 may be the result of an overload condition due to the applied energizing current across the linear SMA actuator 30 for too long. The position feedback variation threshold may be variably dependent upon a desired activation time to move the movable element 34 A of rotatable device 34 to the preferred position. It is further understood that the position feedback variation threshold may include a range of permissible limits including selecting a lower feedback variation threshold limit when the desired activation time to move the element 34 A is long, and selecting an upper feedback variation threshold limit when the desired activation time to move the element 34A is short. If the control signal 76 is less than the control signal threshold, the control scheme 200 ends at block 299 because an overload condition has not been detected. If the control signal 76 is greater than the control signal threshold, the control scheme proceeds to block 277 where the overload time counter is increased. The control signal threshold is selected as a limit for an acceptable control signal 76 for generating the activation signal $V_{CMD}$ for controlling the linear SMA actuator. The control signal threshold may include a range of permissible limits including selecting a lower threshold limit to substantially reduce premature detection of an overload condition, and selecting an upper threshold limit to substantially conform to the preferred position of the movable element.

Referring to decision block 278, the overload time counter is compared to an overload time threshold. The overload time threshold is selected as a sufficient period of time to detect an overload condition when the control scheme 200 has determined a predetermined number of times (i.e., windows) within the window period that the position feedback variation is less than the position feedback variation threshold (e.g., block 270) and the control signal 76 is greater than the control signal threshold (e.g., block 276). The overload time threshold may be variable and selected based on overload cycle life and operating cycle life associated with the material of the linear SMA actuator 30. If the overload time counter is less than the overload time threshold, the control scheme 200 ends at block 299 because the overload condition has not been detected. If the overload time counter is greater than the overload time threshold, an overload condition is detected, and overload protection (e.g., overload protection scheme 600 shown in FIG. 12) may be utilized to prevent the development of the overload condition in the linear SMA actuator 30. In other words, for an overload condition to be detected, the position feedback variation must be less than the position feedback variation threshold and the control signal 76 must be greater than the control signal threshold a number of predetermined times (i.e., windows) within the window time period.

Referring to FIGS. 6 and 11, a control scheme 300 may detect an overload condition by monitoring the integration of the control signal 76 over a period of time, wherein the control signal 76 is generated by the voltage limiter 74 and includes maximum and minimum control signal values associated with the voltage potential ($V_B$) and the ambient temperature (T). Alternatively, the control scheme 300 may detect an overload condition by monitoring the integration of the absolute value of the error signal 77 over a period of time. As aforementioned, the error signal 77 is based upon the command signal 71 (e.g., a preferred position of element 34A of rotatable device 34) and the present position feedback signal (e.g., a present position $P_M$ of element 34A of rotatable device 34). Integration of the control signal 76 over a period of time will be discussed herein. The control scheme 300 starts and the reset time counter is increased at blocks 301 and 302, respectively. The reset time counter is compared to a window time threshold at decision block 303. If the reset time counter is greater than the reset time threshold, an overload time counter, the reset time counter and the integration of the signal (e.g., control signal 76 or error signal 77) are reset to zero at block 304 before proceeding to block 376. If the reset time counter is less than the reset time threshold, the control scheme 300 proceeds to block 376, where the integration of the control signal 76 from the overload time counter equal to zero is monitored. The reset time threshold is selected as a period of time when initial values and parameters required for monitoring and detecting an overload condition are reset. For example, the overload time counter, the integration and the window time counter may be reset every three seconds. Integrating the signal (e.g., control signal or error signal 77) includes determining the total accumulated energy over an integration period. At decision block 370, the integration of the signal and an integration threshold are compared. If the integration of the control signal 76 is greater than the integration threshold, the overload condition is detected, and an overload protection control scheme (e.g., overload protection scheme 600 shown in FIG. 12) is run to prevent the development of the overload condition in the linear SMA actuator 30. If the integration of the control signal 76 (or error signal 77) is less than the integration threshold, the control scheme 300 proceeds to block 377, where the overload time counter is increased. Referring to decision block 378, the overload time counter is compared to an overload time threshold. If the time counter is less than the overload time threshold, the control scheme 300 ends at block 399 because the overload condition has not been detected. If the time counter is greater than the overload time threshold, the control scheme 300 proceeds to block 380, where the difference between the integration of the signal and the control threshold is calculated before the control scheme ends at block 399. The overload time threshold may be variable and selected based on overload cycle life and operating cycle life associated with the material of the linear SMA actuator 30.

Figure 12:
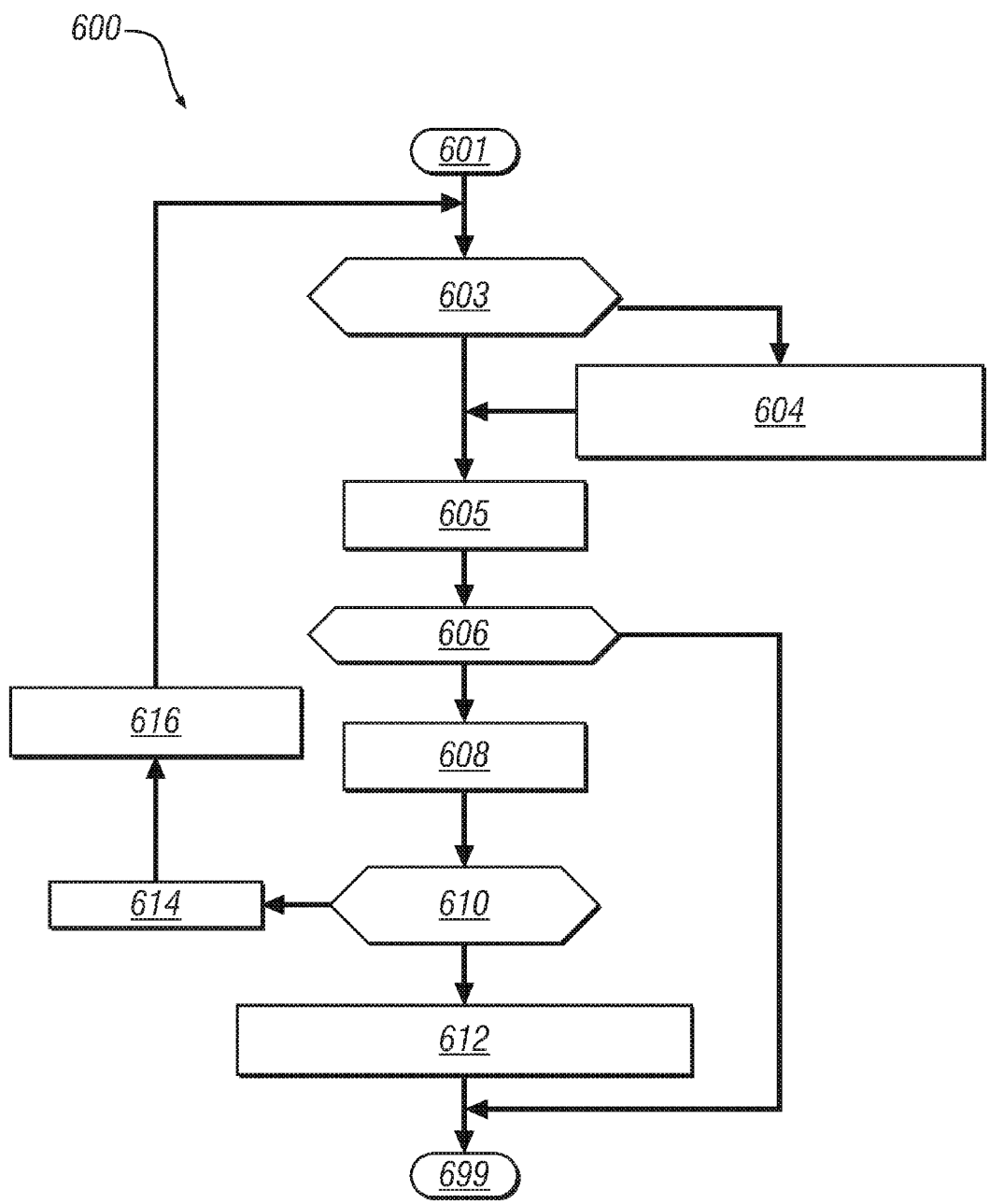
FIG. 12 illustrates a control scheme for preventing an overload condition detected by one of the control schemes of FIGS. 9-11, in accordance with the present disclosure.

In accordance with an exemplary embodiment of the present disclosure, an exemplary overload protection control scheme 600 is illustrated in FIG. 12. When the occurrence of an overload condition of the linear SMA actuator 30 is detected by any of the control schemes described in FIGS. 9-11, the overload protection control scheme 600 is configured to scheme to prevent commanding an activation signal $V_{CMD}$ 79 to the linear actuator that may electrically overload the linear SMA actuator 30. It is appreciated that if an overload condition is detected any of control schemes 100, 200 and 300, the overload condition may be recorded in the memory of the activation controller 40. The memory may be volatile where no rest or de-energizing will happen or may be non-volatile. The memory within the controller 40 is further configured to store the number of overload cycles, the number of cycles, the last overload positions, the last actuation time and whether an overload condition was detected during a previous activation. Furthermore, the controller 40 may be configured to communicate with the position feedback sensor 50, wherein a derivative may be read for overload and precise control relating to, but not limited to, speed control and maintaining profile of vehicle operating speed conditions.

Referring to block 601, the overload protection control scheme 600 commences subsequent to the detection of an overload condition (i.e., control schemes 100, 200 and 300). At decision block 603 a reset time is compared to a reset time threshold. It is appreciated that the reset time is incremented periodically every time before the activation controller 40 executes the overload protection control scheme 600 even when no overload condition is detected. Counting starts the first time the activation controller 40 executes the overload protection control scheme 600. Alternatively, the counting of the reset time counter may start after a predetermined number of overload conditions are detected. The reset time threshold has a much larger value than the window time threshold discussed above. In a non-limiting example, the reset time threshold is 30 seconds. If the reset time is greater than the reset time threshold, the control scheme 600 proceeds to block 604 where the reset time and an overload cycle counter are reset to zero and the linear SMA actuator 30 is energized prior to proceeding to block 605. If the reset time is less than the reset time threshold, the control scheme 600 directly proceeds to block 605 and 606, where an overload flag bit set by the control schemes 100, 200 or 300 is checked. If an overload condition is not detected at block 606, the control scheme proceeds to block 699 because an overload condition has not been detected. If an overload condition is detected at block 606, the control scheme proceeds to block 608 where the detected overload condition is stored and recorded (i.e., the activation controller 40). It is understood that at block 608, the number of detected overload condition cycles within the reset time period are stored as an aggregate total of overload condition cycles. For instance, each time an overload condition is detected within the window time period, the overload condition is recorded as a single overload condition cycle. The number of overload condition cycles is compared to an overload cycle threshold at decision block 610. If the number of overload condition cycles is greater than or equal to the overload cycle threshold at decision block 610, the linear SMA actuator 30 is completely de-energized at block 612. If the number of overload condition cycles is less than the overload cycle threshold, the control scheme 600 proceeds to block 614 where the linear SMA actuator 30 is momentarily de-energized during a deactivation period and subsequently energized at block 616 after the deactivation period has elapsed. It is understood that the momentary de-energization cools the linear SMA actuator 30 during the deactivation period, and thus, allowing blockage to clear. Upon energizing at decision block 616, the control scheme 600 proceeds back to decision block 603. It is appreciated that if the number of overload condition cycles is not at least the overload cycle threshold, the linear SMA actuator 30 is de-energized and reenergized where control schemes (e.g., 100, 200 and 300) are continuously applied during each subsequent cycle to detect an overload condition.

In addition to the overload protection control scheme 600 described above, other embodiments are envisioned. One embodiment envisioned to prevent the overload condition from damaging the linear SMA actuator 30 is to simply de-energize the linear SMA actuator 30 immediately. A second embodiment envisioned is to momentarily cut power to the linear SMA actuator 30 (i.e., de-energize the linear SMA actuator 30) and after a deactivation period while the linear SMA actuator is de-energized, energizing the linear SMA actuator 30. De-energizing the linear SMA actuator 30 is effective to allow the linear SMA actuator 30 to substantially cool. Cooling the linear SMA actuator 30 prevents build up blockage on the linear SMA actuator 30 which may lead to damage. If the overload condition is still detected after several cycles of energizing and de-energizing the linear SMA actuator 30, the linear SMA actuator 30 may be completely de-energized for the reset time period after which the previous sequences may be retried.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for detecting a mechanical overload condition of an energized linear actuator and providing a mechanical overload protection scheme to prevent commanding an activation signal to the linear actuator that may mechanically overload the linear actuator when the mechanical overload condition is detected, comprising:

monitoring feedback variation of a movable element associated with the linear actuator comprising monitoring a present feedback signal indicating a present position of the movable element during a present activation cycle of the linear actuator, monitoring a previous feedback signal indicating a previous position of the movable element immediately before the present activation cycle is initiated whilst the linear actuator is deactivated, comparing the present feedback signal and the previous feedback signal and determining the feedback variation based on a difference between the present position and the previous position of the movable element;
comparing the feedback variation to a feedback variation threshold; and one of
if the feedback variation is greater than the feedback variation threshold, determining the mechanical overload condition does not exist and the mechanical overload protection scheme will not be provided;
only if the feedback variation is less than the feedback variation threshold:
monitoring an input signal associated with the activation signal for controlling the linear actuator,
comparing the input signal to an input signal threshold, and
detecting the mechanical overload condition and providing the mechanical overload protection scheme when the feedback variation is less than the feedback variation threshold and the input signal is greater than the input signal threshold.

2. The method of claim 1 wherein the present position corresponds to at least one of a rotary position, a rotary angle, a linear movement through the movable element and an electric resistance of the linear actuator.

3. The method of claim 1 wherein monitoring an input signal associated with the activation signal for controlling the linear actuator comprises:
monitoring a command signal indicating a preferred position of the movable element;
monitoring the present feedback signal indicating the present position of the movable element;
comparing the command signal and the present feedback signal; and
determining an error signal based on the comparing.

4. The method of claim 3 wherein comparing the input signal to an input signal threshold comprises:
comparing the error signal to an error threshold;
monitoring an overload time counter;
comparing the overload time counter to an overload time counter threshold; and
detecting the mechanical overload condition when the feedback variation is less than the feedback variation threshold, the error signal is greater than the error threshold, and the overload time counter exceeds the overload time counter threshold.

5. The method of claim 1, wherein monitoring the input signal associated with the activation signal for controlling the linear actuator comprises:
monitoring a command signal indicating a preferred position of the movable element;
monitoring the present feedback signal indicating the present position of the movable element;
comparing the command signal to the present feedback signal;
determining an amplified signal based on applying PI control to the comparison of the command signal to the present feedback signal;
monitoring ambient temperature substantially at the linear actuator and voltage potential of an electrical energy storage device utilized for providing energizing current across the linear actuator during periods of activation responsive to the activation signal; and
determining a control signal based on the amplified signal, the ambient temperature and the voltage potential, the control signal including maximum and minimum values associated with the voltage potential and the ambient temperature.

6. The method of claim 5 wherein comparing the input signal to an input threshold comprises:
comparing the control signal to a control signal threshold;
monitoring an overload time counter;
comparing the overload time counter to an overload time counter threshold; and
detecting the mechanical overload condition when the feedback variation is less than the feedback variation threshold, the control signal is greater than the control signal threshold and the overload time counter exceeds the overload time counter threshold.

7. The method of claim 6 wherein the control signal indicates one of pulse width-modulation, current regulation and voltage regulation controlling energizing current across the linear actuator during periods of activation responsive to the activation signal.

8. The method of claim 1 wherein detecting the mechanical overload condition and providing the mechanical overload protection scheme when the feedback variation is less than the feedback variation threshold and the input signal is greater than the input signal threshold comprises immediately de-energizing the linear actuator thereby cooling the linear actuator.

9. The method of claim 8 further comprising reenergizing the linear actuator subsequent to de-energizing the linear actuator after a predetermined duration.

10. The method of claim 1 further comprising monitoring an initial delay period prior to monitoring feedback variation of a movable element associated with the linear actuator, the initial delay period sufficient to allow residual heat across the energized linear actuator to decrease thereby reducing false overload condition detection due to low feedback variation.

11. Method of claim 10 wherein the initial delay period is variably selected comprising selecting a longer initial delay period when substantially no residual heat is retained across the linear actuator prior to energizing, and selecting a shorter initial delay period when residual heat is retained across the linear actuator prior to energizing.

12. Method for detecting of a mechanical overload condition of an energized linear actuator and providing a mechanical overload protection scheme to prevent commanding an activation signal for controlling a movable element associated with the linear actuator that may mechanically overload the linear actuator when the mechanical overload condition is detected, comprising:
monitoring an overload time counter;
monitoring feedback variation of the movable element comprising:
monitoring a present position of the movable element during a present activation cycle of the linear actuator;
monitoring a previous position of the movable element immediately before the present activation cycle is initiated whilst the linear actuator is deactivated;
comparing the present position and the previous position; and
determining the feedback variation based on a difference between the present position and the previous position of the movable element;
comparing the feedback variation to a feedback variation threshold; and one of
if the feedback variation is greater than the feedback variation threshold, determining the mechanical overload condition does not exist and the mechanical overload protection scheme will not be provided;
only if the feedback variation is less than the feedback variation threshold:

monitoring an input signal based upon a preferred position of the movable element and the present position of the movable element, comparing the input signal to a selected input signal threshold, comparing the overload time counter to an overload time counter threshold, detecting the mechanical overload condition when the input signal is greater than the selected input signal threshold and the overload time counter is greater than the overload time counter threshold, and providing the overload protection scheme based on detecting the mechanical overload condition.

13. The method of claim 12 wherein the linear actuator comprises one of a wire and a cable fabricated from an active material.

14. The method of claim 12 wherein the overload time counter threshold is based on an overload cycle life and an operating cycle life associated with material of the linear actuator.

15. The method of claim 12 wherein the selected input signal threshold includes a range of permissible limits comprising one of a lower threshold limit to substantially reduce premature detection of an overload condition and an upper threshold limit to substantially conform to the preferred position of the movable element.

16. The method of claim 12 wherein the feedback variation threshold is variably dependent upon a desired activation time to move the movable element to the preferred position.

17. The method of claim 15 wherein the feedback variation threshold includes a range of permissible limits comprising one of a lower feedback variation threshold limit when the desired activation time to move the movable element is long and an upper feedback variation threshold limit when the desired activation time to move the movable element is short.

18. The method of claim 12 wherein providing the overload protection scheme based on detecting the mechanical overload condition comprises:

monitoring a number of overload condition cycles during period of time;

comparing the number of overload condition cycles to an overload cycle threshold; and de-energizing the linear actuator to substantially cool the linear actuator when the number of overload condition cycles is at least the overload cycle threshold and momentarily de-energizing the linear actuator when the number of overload condition cycles is less than the overload cycle threshold.

19. Apparatus for detecting a mechanical overload condition of an energized linear actuator and providing an mechanical overload protection scheme when the mechanical overload condition is detected, comprising:

a movable element coupled to a linear actuator; and an activation controller:

monitoring feedback variation of the movable element coupled to the linear actuator comprising monitoring a present feedback signal indicating a present position of the movable element during a present activation cycle of the linear actuator, monitoring a previous feedback signal indicating a previous position of the movable element immediately before the present activation cycle is initiated whilst the linear actuator is deactivated, comparing the present feedback signal and the previous feedback signal and determining the feedback variation based on the comparing;

comparing the feedback variation to a feedback variation threshold; and one of if the feedback variation is greater than the feedback variation threshold, determining the mechanical overload condition does not exist and the mechanical overload protection scheme will not be provided;

only if the feedback variation is less than the feedback variation threshold:

monitoring an input signal associated with the activation signal for controlling the linear actuator, comparing the input signal to an input signal threshold, and detecting the mechanical overload condition and providing the mechanical overload protection scheme when the input signal is greater than the input signal threshold.

\* \* \* \* \*